United States Patent [19]

Ishiguro

[11] Patent Number: 5,496,233
[45] Date of Patent: Mar. 5, 1996

[54] CONTROL DEVICE AND A METHOD FOR CONTROLLING AND RESETTING A LOCK UP HYDRAULIC PRESSURE SCHEDULE FOR SUBSEQUENT GEAR SHIFTINGS IN AN AUTOMATIC TRANSMISSION

[75] Inventor: Toshiaki Ishiguro, Aichi, Japan

[73] Assignee: Aisin Seiki Kabushiki Kaisha, Kariya, Japan

[21] Appl. No.: 298,404

[22] Filed: Aug. 31, 1994

[30] Foreign Application Priority Data

Sep. 1, 1993 [JP] Japan .................... 5-217746

[51] Int. Cl.$^6$ .................. B60K 20/00; F16H 45/02
[52] U.S. Cl. .................. 477/169; 477/64; 477/175; 477/180
[58] Field of Search .................. 477/64, 70, 79, 477/80, 168, 169, 174, 175, 176, 180, 904; 364/424.1

[56] References Cited

U.S. PATENT DOCUMENTS

| | | | |
|---|---|---|---|
| 5,047,936 | 9/1991 | Ishii et al. | 364/424.1 |
| 5,060,769 | 10/1991 | Yoshimura et al. | 477/169 X |
| 5,063,814 | 11/1991 | Baba et al. | 364/424.1 X |
| 5,086,666 | 2/1992 | Moriki | 364/424.1 X |
| 5,086,894 | 2/1992 | Iizuka et al. | 477/176 X |
| 5,332,073 | 7/1994 | Iizuka | 477/174 X |

FOREIGN PATENT DOCUMENTS 63-88372  4/1988  Japan .

*Primary Examiner*—Khoi Q. Ta
*Attorney, Agent, or Firm*—Sughrue, Mion, Zinn, Macpeak & Seas

[57] ABSTRACT

A locking-up hydraulic pressure control device of an automatic transmission comprises a memory, a controller, a second memory, and a time schedule management. The memory stores a hydraulic pressure control time schedule from the beginning of shift operation to the end. The controller means controls a locking-up hydraulic pressure in accordance with said hydraulic pressure control time schedule to be provided to a lock-up clutch that mechanically connects and disconnects a pump impeller of a torque converter of said automatic transmission connected to an engine and a turbine runner connected to transmission gears. The second memory stores a time schedule of engine revolution during a shift operation. The time schedule management means resets said hydraulic pressure control time schedule higher pressures than the former pressures in case if engine revolution exceeds said time schedule of engine revolution during the shift operation by a certain given limit.

3 Claims, 3 Drawing Sheets

CONTROL DEVICE AND A METHOD FOR CONTROLLING AND RESETTING A LOCK UP HYDRAULIC PRESSURE SCHEDULE FOR SUBSEQUENT GEAR SHIFTINGS IN AN AUTOMATIC TRANSMISSION

BACKGROUND OF THE INVENTION

1. Field of the Invention

The present invention relates to a control device and a method for controlling a locking-up hydraulic pressure which is provided to a lock-up clutch disposed in a torque converter of an automatic transmission. Said lock-up clutch is a clutch which mechanically connects and disconnects a pump impeller and a turbine runner of the torque converter.

2. Description of the Prior Art

Japanese Unexamined Patent Publication (Kokai) No. 88372/1988 discloses a control method for locking up hydraulic pressure in an automatic transmission.

According to this method, shift operation is performed while lock-up clutch is on i.e. connected mechanically. In this case, the lock-up solenoid valve is controlled in accordance with a duty ratio signal which is different from a usual one from a decision to begin shift operation has made by a transmission signal to the shift operation is finished. This makes the looking-up hydraulic pressure lower than usual. Accordingly, the lock-up clutch begins slipping, and a shook in shift operation is decreased.

However, applying this known control method for the looking-up hydraulic pressure in an automatic transmission has a following drawback. Namely, the engine revolution may rise abnormally in case if the looking up hydraulic pressure is lower than a predetermined level. This may occur by variation among products. It is not desirable to ruin the engine by over-revolution nor to consume fuel too much in vain. On the other hand, in case of setting the-locking up hydraulic pressure in higher level previously to avoid over-revolution, it is not effective in decreasing a shock in shift operation. Consequently, it is very hard to tune the duty ratio on which the looking up hydraulic pressure is determined.

SUMMARY OF THE INVENTION

Therefore the prime object of the present invention is to solve the problem described above.

Another object of the present invention is to provide a control device and a method for controlling the locking-up hydraulic pressure in an automatic transmission which is able to regulate looking up hydraulic pressure correctly although variation among products is not small.

According to the present invention, when a shift operation is performed for the first time while lock-up clutch is on, the looking-up hydraulic pressure is controlled in accordance with a hydraulic pressure control time schedule which is previously set lower than the preferable level. In the shift operation after the first time, the locking-up hydraulic pressure is controlled according to a previous hydraulic pressure control time schedule in case if previous maximum revolution of the engine does not come to excess over a certain given predetermined limit. If the previous maximum revolution comes to excess over the predetermined limit, the locking-up hydraulic pressure is controlled in accordance with a hydraulic pressure control time schedule which is set higher than the previous hydraulic pressure control time schedule.

Employing the present invention will make it possible to perform shift operation without over-revolution of the engine nor shock of shifting. Because the maximum revolution of the engine does not come to excess over the predetermined limit after the first time even if product variation is not small.

Moreover, the present invention can be embodied with addition of an only single sensor which detects the revolution of the engine. Hence the control device is very simple and it does not cost much.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Having generally described the present invention, a further understanding can be obtained by reference to a certain specific preferred embodiment which is provided herein for purposes of illustration only and is not intended to be limiting unless otherwise specified.

Figure 1:
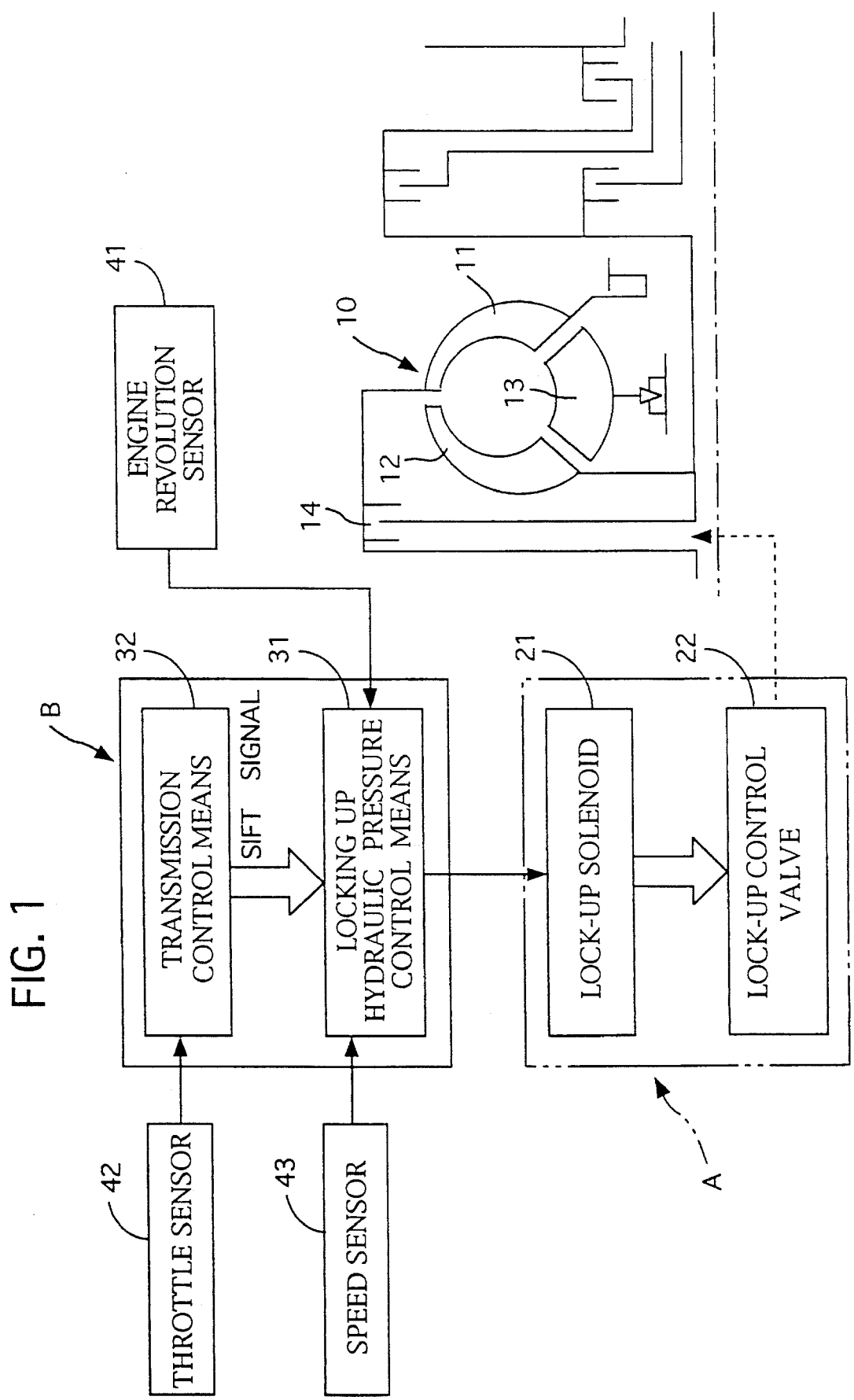
FIG. 1 is a schematic illustration of the locking-up hydraulic pressure control system in an automobile four-speed automatic transmission with a lock-up mechanism of a preferred embodiment according to the present invention.

FIG. 1 illustrates a looking-up hydraulic pressure control device in an automobile four-speed automatic transmission with a lock-up mechanism according to the present invention.

The automatic transmission is employing a torque converter 10 consisting of a pump impeller 11 driven by an engine (not shown), a turbine runner 12, and a stator 13. A lock-up clutch 14 is attached to the torque converter 10, and is operated by hydraulics i.e. by a looking-up hydraulic pressure. The pump impeller 11 and the turbine runner 12 are connected or disconnected mechanically by operating the lock-up clutch 14 on or off.

Locking-up hydraulic pressure, which is provided to the lock-up clutch 14, is controlled by a hydraulic pressure controller A consisting of a lock-up solenoid 21 and a lock-up control valve 22 driven by the lock-up solenoid 21 as well known. Also the lock-up solenoid 21 is controlled by an electronic controller B which includes a looking up-pressure control means 31.

Figure 2:
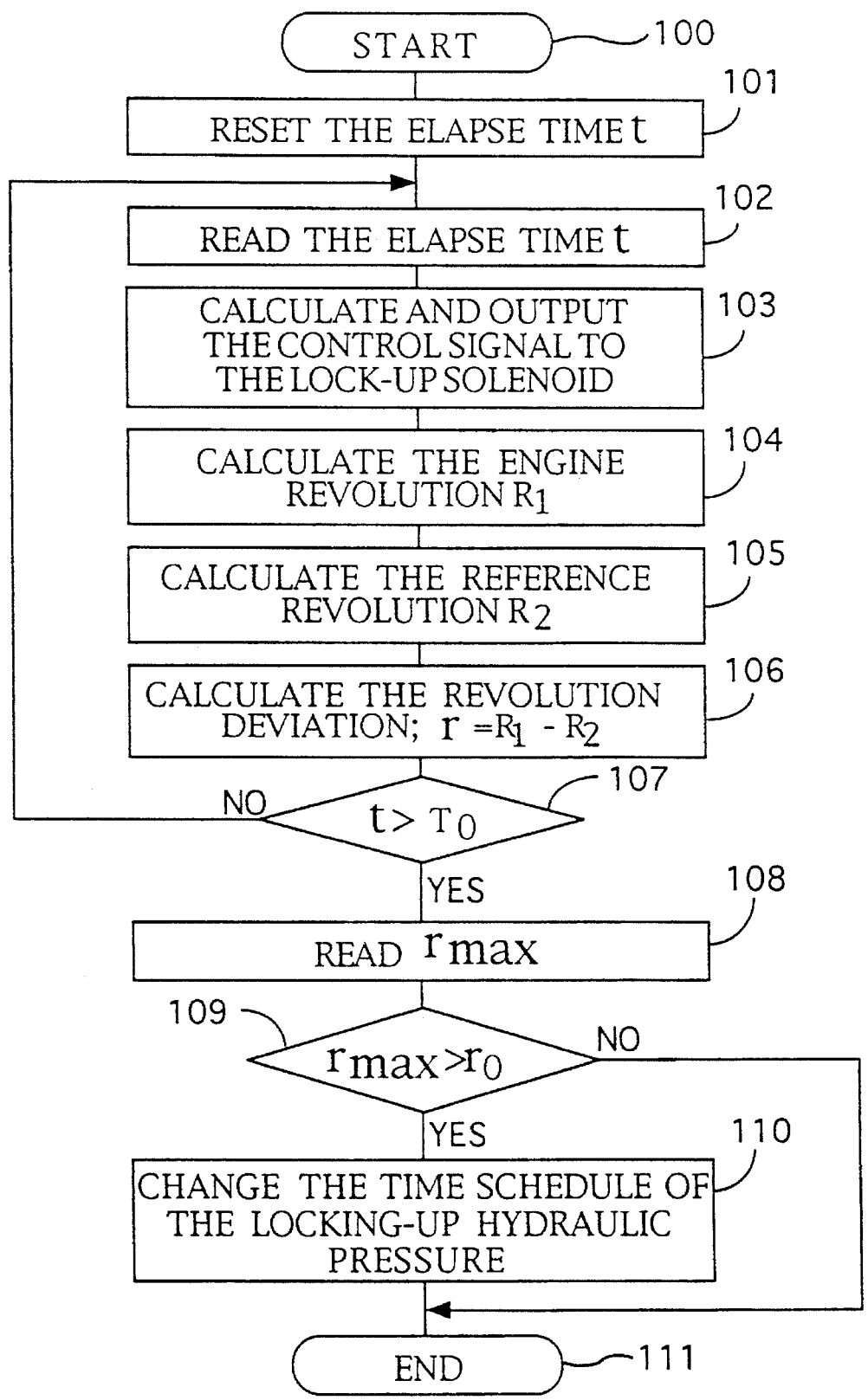
FIG. 2 a flow chart of locking up hydraulic pressure control algorithm of a preferred embodiment according to the present invention.

The locking-up pressure control means 31 will execute the program illustrated in FIG. 2 when a shift signal is provided by a transmission control means 32, which is also arranged in the electronic controller B. An output signal is provided from an engine revolution sensor 41 which detects revolution rate of the engine for the looking-up hydraulic pressure control means 31.

In addition, the transmission control means 32 controls a shift operation and a lock-up operation according to a throttle ratio and a speed of the vehicle which are provided by a throttle sensor 42 and a speed sensor 43 as well known.

How the operation of the locking-up hydraulic pressure control means 31 is will be explained as following with the reference of FIG. 2. This operation is performed only when the lock-up clutch 14 is on and a shift signal is provided from the transmission control means 32 to the locking up hydraulic pressure control means 31.

As soon as a shift signal is given to the locking up hydraulic pressure control means 31, the program illustrated in FIG. 2 will start at the step 100. At following step 101, the program resets a timer which counts the elapse time "t". At the step 102, the elapse time "t" is stored by the program. And at the step 103, the program makes calculation and provides a control signal output to the lock-up solenoid 21. Where s looking-up hydraulic pressure is previously stored in a memory (not shown) as a time schedule illustrated below in FIG. 3. A line a-b-c-d in the graph shows the time schedule of the locking-up hydraulic pressure which is previously stored in the memory for the first time.

After that, the program detects an actual revolution rate of the engine based on a signal which is provided by the engine revolution sensor 41 at the step 104. At the step 105, a reference revolution rate R2 of the engine is also determined in accordance with the elapse time "t" and a engine revolution rate time schedule stored in a second memory (not shown) as shown above in FIG. 3. And at the step 106, a revolution rate difference or a deviation "r" between the actual revolution rate R1 and the reference revolution rate R2 is calculated and stored in a memory (not shown).

Then, the elapse time "t" is judged at the step 107 if it is or not over a predetermined time To which stands for a normal duration from the beginning to the end of the shifting operation. To is set to be about 1 second. If it is judged "No" at the step 107, the program goes back to the step 102 and the following steps 102 to 107 are repeated again and again. Or if it is judged "Yes" at the step 107, the program goes on to the next step 108.

Here, at step 108, "$r_{max}$" is stored as the maximum value of the revolution deviation "r" which was calculated and stored as time history at step 106. And at step 109, the maximum value "$r_{max}$" of the revolution deviation is compared with a predetermined threshold "$r_0$", then it is judged whether if "$r_{max}$" exceeds the threshold or not.

In case if the maximum deviation "$r_{max}$" does not exceed the threshold "$r_0$", i.e the time history of the engine revolution is not deviating far away from the predetermined time schedule as a solid line shown above in FIG. 3, the program goes on to the end step 111. So the time schedule of the looking-up hydraulic pressure control is kept as it was.

Figure 3:
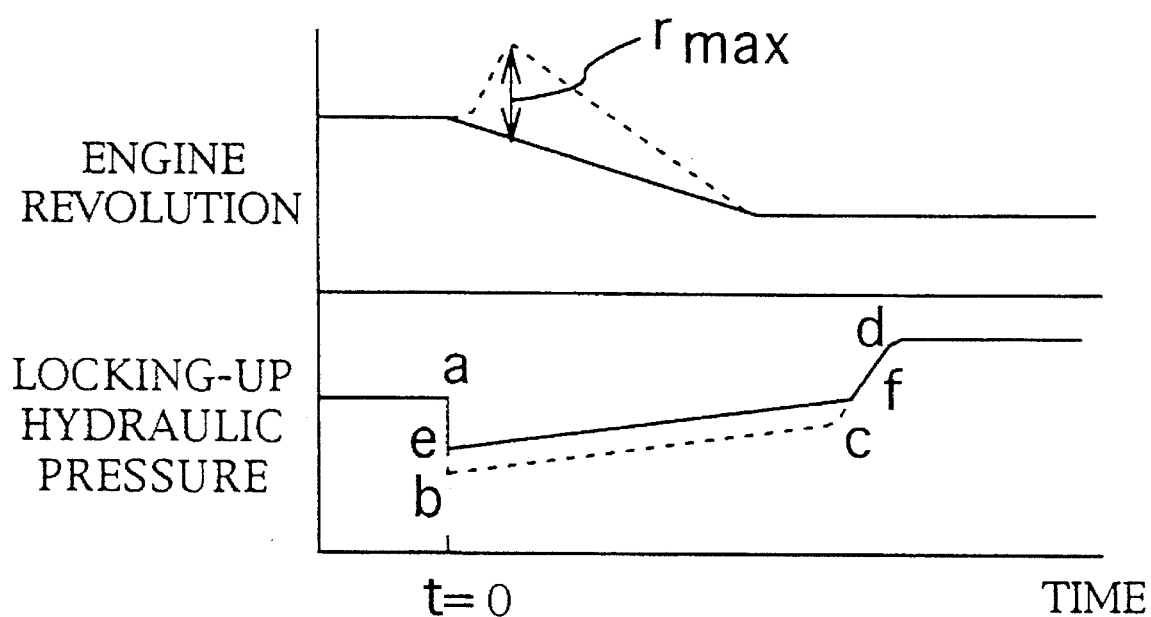
FIG. 3 is a time chart of assistance in explaining the action of the engine revolution and the looking-up hydraulic pressure.

Else if the maximum deviation "$r_{max}$" does exceed the threshold "$r_0$", because the revolution rate of the engine is not controlled in right way at above described cycling steps 102 to 107, the program goes on to the step 110. In this case, the time history of the revolution rate R1 shown as a broken line in FIG. 3 exceeds the time schedule of the reference revolution R2 too much. This means that the looking-up hydraulic pressure is not enough for the preferred shift operation. Thus, at the step 110, the time schedule of the locking-up hydraulic pressure control is changed, i.e. the locking-up hydraulic pressure time schedule is multiplied by a predetermined certain ratio more than 1 so that it is increased in shift operation. The solid line a-e-f-d in FIG. 3 shows the newly determined looking-up hydraulic pressure control time schedule. And the program goes on to the end step 111.

Thus, after once the program shown in FIG. 2 has been executed, the newly determined hydraulic pressure control time schedule a-e-f-d shown in FIG. 2 is referred as the lock-up solenoid control signal at step 103. In this way, after the first time sift operation is performed, the peak of the engine revolution is suppressed and the engine revolution time history comes to an approximation of the reference time schedule shown as a solid line above in FIG. 3.

In such a manner, over-revolution of the engine is prevented. And sifting shook is also prevented because the control time schedule of the locking-up hydraulic pressure is, at first, set a little lower than appropriate one. Thus, by the well controlled looking-up hydraulic pressure, the shift operation is performed without over-revolution of the engine nor shifting shook. This is realized with an addition of the single engine revolution sensor and a very simple software, so that it does not cost much.

By the way, increment of the locking-up hydraulic pressure during the shift operation may be made by other ways. For example, the looking-up hydraulic pressure may be increased by adding a certain given amount to the previous locking-up hydraulic pressure control time schedule. In other way, having a number of different looking-up hydraulic pressure control time schedules stored in a memory, the higher one may be chosen by the program.

Having now fully described the present invention, it will be apparent to one of ordinary skill in the art that many changes and modifications can be made thereto without departing from the spirit or scope of the present invention as set forth herein.

What is claimed is:

1. In a lock-up hydraulic pressure control device of an automatic transmission comprising:

means for memory storing a schedule of hydraulic pressures with respect to time from the beginning of shift operation to the end;

a control means for controlling a looking-up hydraulic pressure in accordance with said schedule to be provided to a lock-up clutch of a hydrodynamic torque converter said automatic transmission and an engine, the improvement comprising a second means for storing a time schedule of reference engine means for detecting engine speeds during said shift operation;

means for determining the differences between said detected engine speeds and said reference engine speeds;

pressure control means for resetting said hydraulic pressure in said schedule for subsequent shifts at higher pressures than the former pressures if a difference between engine speeds and reference engine speeds exceeds a certain given limit during said shift operation.

2. In a lock-up hydraulic pressure control device of said automatic transmission according to claim 1, wherein said pressure control means increases said hydraulic pressure of said hydraulic schedule by a certain given ratio higher than before said shifting operation.

3. In a method for controlling a lock-up hydraulic pressure in an automatic transmission, which controls said hydraulic pressure in accordance with a hydraulic pressure control time schedule to be provided to a lock-up clutch that mechanically connects and disconnects a pump impeller of a torque converter of said automatic transmission connected to an engine and a turbine runner connected to transmission gears during a gear shifting operation, the improvement comprising the steps of detecting engine speeds, determining the difference between the detected engine speeds and reference engine resetting said hydraulic pressure control time schedule to have higher pressures than the former pressures if a difference between detected engine speeds and reference engine speeds exceeds a certain given limit and controlling said hydraulic pressure for subsequent shift operations in accordance with the resulting reset hydraulic pressure control time schedule.

* * * * *